United States Patent [19]

McClintock

[11] Patent Number: 5,046,676
[45] Date of Patent: Sep. 10, 1991

[54] DEVICE AND METHOD FOR ADJUSTING BELT TENSION ON A WEB SLITTER-REWINDER

[75] Inventor: James A. McClintock, Burton, Ohio

[73] Assignee: Electrolock, Inc., Burton, Ohio

[21] Appl. No.: 488,290

[22] Filed: Mar. 5, 1990

[51] Int. Cl.⁵ .................. B65H 35/02; F16H 7/08
[52] U.S. Cl. .................... 242/56.2; 242/56.9; 242/61.1 R; 474/110
[58] Field of Search ............ 242/56 R, 56.2, 75; 474/110, 111, 113, 115, 136; 74/89.15

[56] References Cited

U.S. PATENT DOCUMENTS

| | | | |
|---|---|---|---|
| 1,929,852 | 10/1933 | Reid | 474/110 |
| 2,005,942 | 6/1935 | St. Clair Lake | 242/75 |
| 2,578,662 | 12/1951 | Bader | 474/136 X |
| 3,275,254 | 9/1966 | DuBois | 242/56.2 |
| 3,386,679 | 6/1968 | Foulon et al. | 242/56.2 |
| 3,963,187 | 6/1976 | Ohi | 242/75 X |
| 4,583,961 | 4/1986 | Kawasawa et al. | 474/113 |

FOREIGN PATENT DOCUMENTS 24524 of 1910 United Kingdom .................. 242/75

Primary Examiner—Daniel P. Stodola
Assistant Examiner—John P. Darling
Attorney, Agent, or Firm—Oldham & Oldham

[57] ABSTRACT

A device for adjusting the tension on a web slitter-rewinder drive belt assembly. More specifically, this device permits the operator to vertically adjust the position of the idler roll on the drive belt assembly using an adjustment mechanism located on an exterior surface of the machine. The device includes a bracket and a cross brace received therein in sliding engagement.

3 Claims, 2 Drawing Sheets

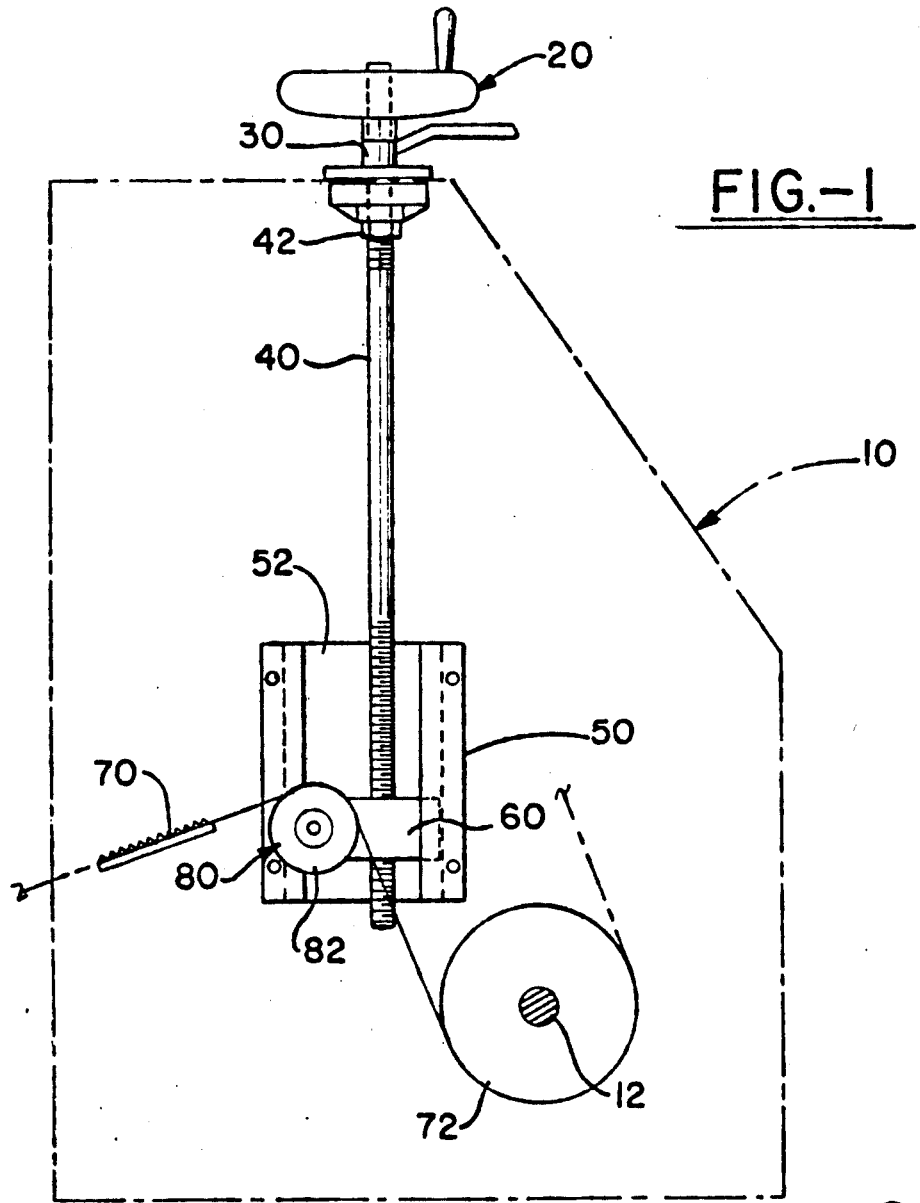
FIG.-1
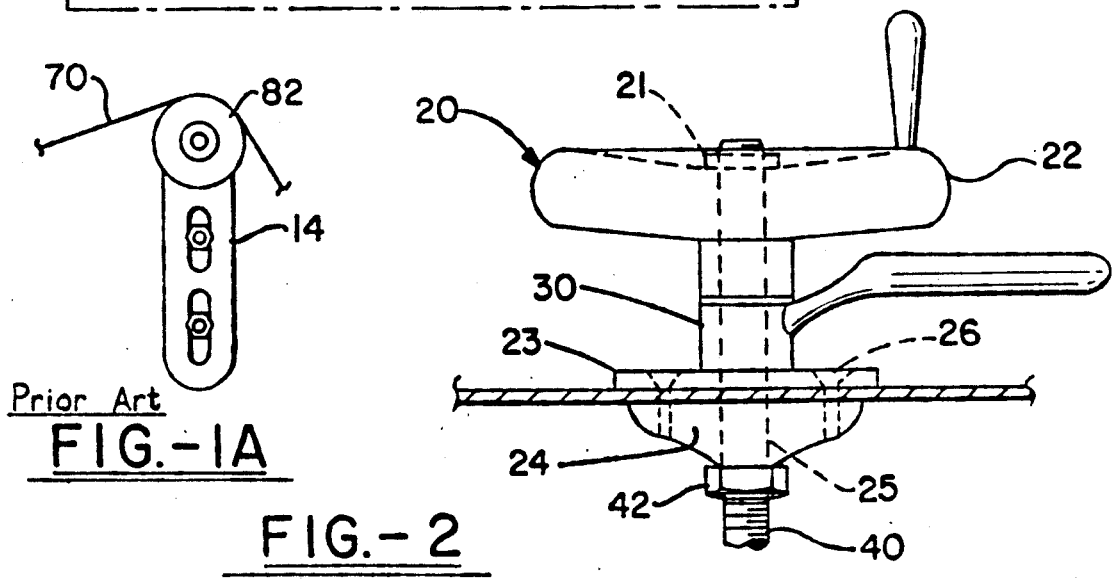
Prior Art
FIG.-1A
FIG.-2

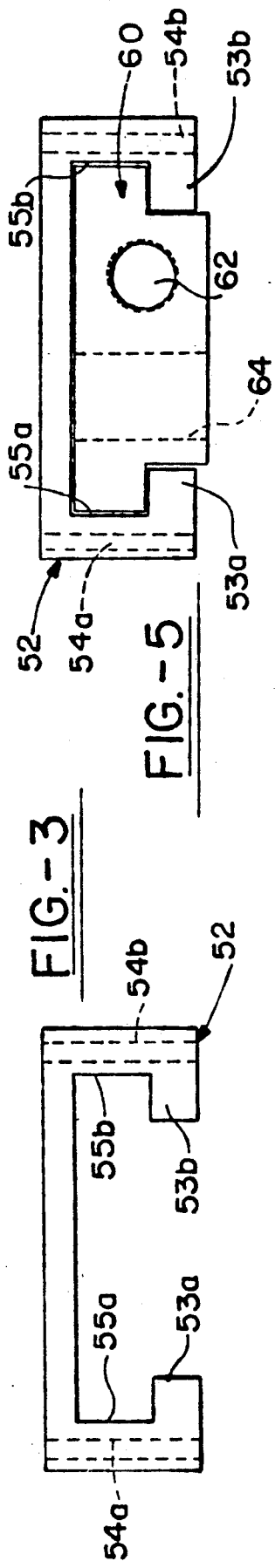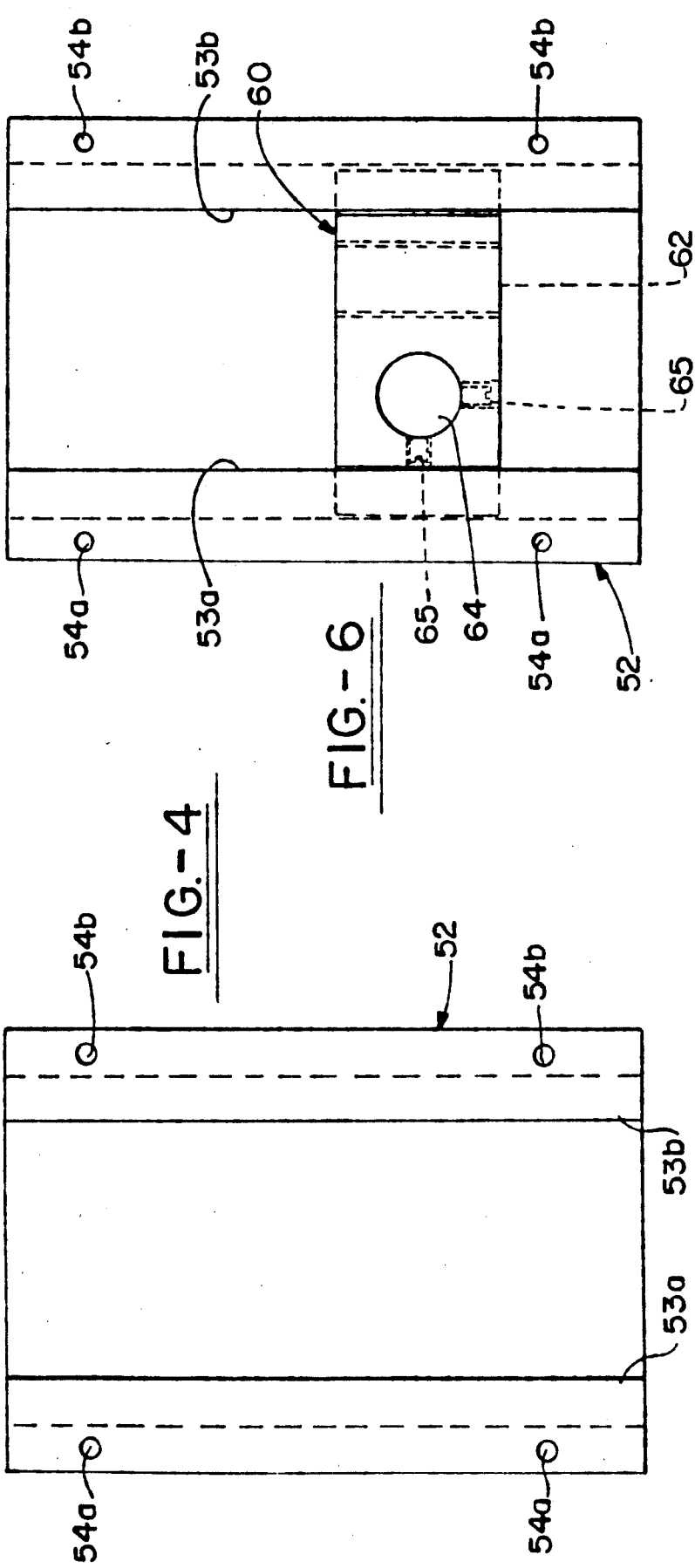

DEVICE AND METHOD FOR ADJUSTING BELT TENSION ON A WEB SLITTER-REWINDER

TECHNICAL FIELD

The present invention, in general, relates to an improvement on a web slitter-rewinder apparatus. More specifically, this improvement discloses an improved manner for adjusting the tension on a web slitter-rewinder drive belt assembly which is quicker, safer and simpler than the conventional means.

BACKGROUND OF THE INVENTION

This invention relates to a slitter-rewinder machine for slitting and rewinding webs of flexible sheet material such as paper, plastic, foil laminates, and the like and more particularly to a rewind apparatus for winding the split strips on individual cores which cores are both controllably driven to provide controlled center wind tension, and also controllably pressed against the web winding drum for maximum uniformity and smoothness of rolls. Such a machine is U.S. Pat. No. 3,122,335 to Dusenbery et al.

In machines of the class to which this invention relates a web of flexible material is unwound from a supply roll and split longitudinally thereof in a plurality of ribbons of desired width, which ribbons are rewound upon individual cores. Since it is virtually impossible to rewind the individual ribbons on adjacent and abutting cores due to interleaving of the adjoining ribbons, the ribbons are separated before being rewound upon the respective cores, or rewind mandrels. Due to an undesired but generally unavoidable nonconformity of thickness across the web being slit, the individual rewind mandrels may be increased in diameter at varying rates and, for this reason, rewind mandrels which are individually supported are preferably employed for proper rewinding of the slit strips.

The prior art discloses rewind mandrels which are rotated by a motorized belt drive assembly. The tension of this belt requires repeated adjustment and repositioning depending on the diameter of the rewind mandrel to be used. The manner for adjusting tension disclosed in the prior art is time consuming. The prior art method of tension adjustment comprises: a motor, a drive belt, a tension bar having alignment slots and being secured to an inner wall of the machine, a idler roll attached to the tension bar, two sets of positioning holes, and a conventional means of anchoring the tension bar.

When a rewind mandrel shaft of a different diameter than the shaft currently in use is desired, the steps involved in adjusting the tension on the belt drive assembly are as follows: the operator must shut off the machine, remove the side panel, loosen the anchoring means of the tension bar to relieve belt tension, fully remove the tension bar from one set of positioning holes, and reposition the tension bar over a new set of positioning holes, attach the tension bar using the same anchoring means, apply external pressure to the belt, and move the tension bar into position, fully secure the tension bar in its new position, replace the side panel and reactivate the machine.

SUMMARY OF THE INVENTION

The present invention is an improvement of the above described tension adjustment. The present invention relates to a method for adjusting tension which offers a greater range of adjustment, makes the necessary adjustment in less time and with less effort by the operator. The adjustment is made with greater safety than previous methods.

The present invention comprises a tension assembly which is permanently secured to a position on an internal wall of the machine, and a means for adjusting said tension assembly. The tension assembly comprises a bracket, a slidable cross brace with a threaded hole cut vertically therein, and an idler roll attached to the cross brace to receive the belt. The adjusting means comprises a threaded rod which passes through the vertical threaded hole in the cross brace and is connected to a means for vertically positioning the cross brace and a means for locking said tension unit in a fixed position.

An object of this invention is to provide an improvement of the slitter-rewinder, U.S. Pat. No. 3,122,335 for making adjustments in tension and position of a rewind drive belt to accommodate shafts of varying diameters.

Another object of this invention is to provide an improvement on a slitter-rewinder, U.S. Pat. No. 3,122,335 such that adjustments on the tension and position of the rewind drive belt to accommodate mandrels of varying diameters are made in substantially less time.

A further object of this invention is to provide an improvement on a slitter-rewinder such that the improvement offers a greater range of positions and tension adjustments on the rewind drive belt.

A further object of this invention is to provide an improvement on a slitter-rewinder such that the adjustments of the rewind drive belt are made without unbolting and rebolting the tension mechanism to another position.

Still another object of the present invention is to provide an improvement of a slitter-rewinder such that adjustments in the tension and position of the rewind drive belt can be made with greater safety.

These and other objects and advantages of the present invention will become more readily apparent from the more detailed description of the preferred embodiments taken in conjunction with the drawings wherein similar elements are identified by like numerals through several views. Such objects and advantages are achieved by a device for adjusting the tension on a web slitter-rewinder drive belt assembly which comprises:

a continuously closed drive belt and a idler roll;

a bracket having a top and bottom edge and being permanently secured to an inside wall of said slitter-rewinder, said bracket having a groove cut vertically from the top edge to the bottom edge, said groove being defined by an inner wall on each side of the bracket, each inner wall having a lip running the length of said wall, extending inward over said groove;

a cross brace with a width which is slightly less than the distance between the two inner walls of said bracket such that said cross brace slidingly engages said bracket, said cross brace having a threaded aperture cut vertically therein and having a means to receive and secure a idler roll which rotates in a plane parallel to the top and bottom edge of said bracket;

an adjustment means for vertically moving the cross brace comprising: a threaded rod having a first and second ends, a rotating means for turning the threaded rod, a locking means for securing the adjustment means in a fixed position, and a means for securing said adjustment means to said slitter-rewinder;

said threaded rod engages the threaded aperture of said cross brace at the first end and the adjustment means at the second end, such that a rotation of the adjustment means rotates the threaded rod which causes said cross brace to move in a vertical direction, thereby changing the tension which said idler roll exerts on said drive belt.

BRIEF DESCRIPTION OF THE DRAWINGS

FIG. 1 is a plan view of the improved device for adjusting tension on a rewind roller and drive belt assembly for a Dusenbery web slitter-rewinder with a general outline of one such machine included for clarity.

FIG. 1A is a plan view of the prior art tension adjustment on a Dusenbery web slitter-rewinder.

FIG. 2 is a front elevational view of the adjustment means of the improved device for adjusting tension on a drive belt assembly for a web slitter-rewinder.

FIG. 3 is a top elevational view of the bracket of the improved device for adjusting tension on a drive belt assembly for web slitter-rewinder.

FIG. 4 is a front elevational view of the bracket of the improved device for adjusting tension on a drive belt assembly for a web slitter-rewinder.

FIG. 5 is a top elevational view of the bracket and cross brace of the improved device for adjusting tension on a drive belt assembly for a web slitter-rewinder.

FIG. 6 is a front elevational view of the bracket and cross brace of the improved device for adjusting tension on a drive belt assembly for a web slitter-rewinder.

DETAILED DESCRIPTION OF THE PREFERRED EMBODIMENT

Now, with reference to the invention illustrated in the drawings, the machine upon which the present invention is employed comprises generally, a bracket 52, a cross brace 60, an idler roll 80, drive belt 70, a threaded rod 40 and an adjustment means 20 as illustrated in FIG. 1.

FIG. 1 illustrates the present invention, an improved device for adjusting tension on a drive belt assembly for a web slitter-rewinder, as incorporated into the web slitter-rewinder 10. The tension assembly, shown generally as 50, is mounted onto an inner wall of the web slitter-rewinder 10. The adjustment means 20 is mounted on the top surface of the web slitter-rewinder 10. A threaded rod 40 integrates the adjustment means 20 with the tension assembly 50. This device functions to apply sufficient tension to drive belt 70 by way of idler roll 80 to allow the motorized unit to rotate the rewind mandrels 12 of the web slitter-rewinder 10 regardless of which standard rewind mandrel diameter is used.

FIG. 1A illustrates the prior art tension adjustment on a Dusenbery web slitter-rewinder. This tension adjustment is located on the Dusenbery slitter-rewinder such that the idler roll 82 is in the same relative position as idler roll 82 in FIG. 1. The drive belt 70 passes over the idler roll 82. The tension on idler roll 82 is adjusted, as previously discussed by manually repositioning bracket 14.

FIG. 2 illustrates the adjustment means 20, shown as a rotating means 22 and a locking means 30, as installed on the top surface of the web slitter-rewinder 10. The rotating means 22 and the locking means 30 are secured to the web slitter-rewinder 10 using a base plate 23 on the top surface fastened to a ball bearing pillow block 24 on the bottom surface by an anchoring means 26, shown as four nut and bolt combinations. However, the base plate 23 and the ball bearing pillow block 24 could be secured to the web slitter-rewinder 10 by any conventional means known in the art.

The base plate 23 and the ball bearing pillow block 24 each have a bore cut through the center which is slightly larger than threaded rod 40. The bore of ball bearing pillow block 24 is of a size as to permit collar adapter 25 to be slid into said bore and retained there with a tight friction fit or secured inside the bore of ball bearing pillow block 24 by any conventional means. Collar adapter 25 had a threaded bore cut through the center thereof which will accept threaded rod 40. A jam nut 42 may be threaded onto threaded rod 40 and tightened against ball bearing pillow block 24 and collar adapter 25 to securely maintain the position of each.

Rotating means 22 has a threaded bore cut through its center which will accept threaded rod 40 and correspondingly engage with the threads of threaded rod 40. One end of threaded rod 40 is securely affixed to the rotating means 22 by a jam nut 21, but could be secured to rotating means 22 by any conventional means known in the art. Rotating means 22 serves to turn threaded rod 40 in either a clockwise or counterclockwise direction. Rotating means 22 is shown as a hand wheel but could be anticipated as any manual or motor operated means of rotating threaded rod 40 known in the art.

Locking means 30 is located immediately adjacent to and below the rotating means 22. Locking means 30 has a threaded bore cut through its center of a size as to accept threaded rod 40. The thread of locking means 30 correspondingly engage with the thread of threaded rod 40. Locking means 30 which in the locked position, serves to hold threaded rod 40 in place and prevent threaded rod 40 from rotating in either direction. Locking means 30 is illustrated in FIG. 2 as a locking lever, but could be shown as any means of restricting the rotation of threaded rod 40 currently known in the art.

The bracket 52 illustrated in FIG. 3 is shown from a top view as having essentially a modified "U" shape. The bracket appears as an essentially flat rectangular base plate wherein the edges of the two longest parallel sides are folded up and inward to a point 90° from the base and the outer ends of each of these edges are folded downward and inward 90° further, forming a lip on each edge which is parallel to the base.

The front view shown in FIG. 4 reveals an essentially rectangular shaped base of bracket 52. This bracket could be made from any heavy metal alloy, such as an iron or steel composition, and either cast as a unitary body or composed of a number of individual pieces welded or secured to one another by any conventional means known in the art. Bracket 52 is mounted to a wall on said web slitter-rewinder 10 such that the device can be integrated into a motorized drive belt assembly. Mounting of bracket 52 is accomplished in the preferred embodiment by anchoring means 54A and 54B which are a series of four nut and bolt combinations, but such mounting could be accomplished by any conventional means known to a person of ordinary skill in the art.

FIGS. 5 and 6 show cross brace 60 as engaged with bracket 52. Cross brace 60 is composed of a heavy metal alloy, such as iron or steel composition, and shown as an essentially rectangular prism with a step cut along the vertical edge of each side of cross brace 60. The cross brace 60 is dimensioned so that the greatest length of said brace 60 is slightly less than the distance between the two inner walls 55A and 55B of bracket 52. The cross brace 60 is slidingly engaged with bracket 52 such that cross brace is permitted to move vertically through the groove of bracket 52 but held onto bracket 52 by lip 53A and 53B on each said of bracket 52.

Cross brace 60 has a hole 62 cut vertically therethrough. Said hole 62 is threaded in a diameter so as to receive and correspondingly engage with the threads of rod 40. Hole 62 is located slightly to one side of the mid point of cross brace 60. Cross brace 60 also has a second hole 64 cut horizontally therethrough from front to back, and is perpendicular to hole 62. Hole 64 is also located to one side of the midpoint of cross brace 60. Hole 64 is of a diameter so as to allow a slight clearance of the shaft of idler roll 80 and hold said shaft with a friction fit. Idler roll 80 is further held in hole 64 by a plurality of set screws introduced into threaded holes 65 which are perpendicular to and intersect said hole 64.

The threaded rod 40 is of a length, a diameter and threading so as to engage with cross brace 60, ball bearing pillow block 24, locking means 30 and rotating means 22. The preferred embodiment of threaded rod 40 is composed of a heavy metal alloy.

One end of threaded rod 40 is threaded through collar adapter 25 of ball bearing pillow block 24, passed through base plate 23, threaded through locking means 30 and rotating means 22. This end of said rod 40 is held in place using jam nut 21 or any other conventional means known in the art. The second end of threaded rod 40 is threaded into hole 62 of cross brace 60 which is slidingly engaged inside the groove of bracket 52.

The improved tension adjustment for a web slitter-rewinder 10 operated by initially positioning the horizontal position of idler roll 80 relative to the motorized drive assembly using set screw means 65 in cross brace 60. The drive belt 70 is looped onto idler roll 80 after connection to all other portions of the motorized assembly. Tension is applied to belt 70 via idler roll 80 as cross brace is moved vertically along the groove of bracket 52.

Cross brace 60 is moved upward onto the bracket 52 by a clockwise turning of rotating means 22. Once sufficient tension is applied to belt 70, locking means 30 is engaged, and serves to hold the position of cross brace 60.

Tension on belt 70 is released after disengaging the motorized drive unit, by releasing the locking means 30 and turning the rotating means 22 in a counterclockwise direction. This counterclockwise motion moves the cross brace 60 in a downward vertical direction along the bracket 52 thereby relieving tension on idler roll 80 and belt 70.

While in accordance with the patent statutes the best mode and preferred embodiment of the invention has been described, it is to be understood that the invention is not limited thereto, but rather is to be measured by the scope and spirit of the appended claims.

What is claimed is:

1. On a slitter-rewinder having a drive belt assembly, a device for adjusting the tension on a drive belt assembly which comprises:

a continuously closed drive belt and a idler roll;

a bracket having a top and bottom edge and being permanently secured to an inside wall of said slitter-rewinder, said bracket having a groove cut from the top edge to the bottom edge, said groove being defined by parallel inner walls on each side of the bracket, each inner wall having a lip running the length of said wall, extending inward over said groove;

a cross brace with a width which is slightly less than the distance between the two inner walls of said bracket such that said cross brace slidingly engages said bracket, said cross brace having a threaded aperture cut vertically therein and having a means to receive and secure a idler roll which rotates in a plane parallel to the top and bottom edge of said bracket wherein such threaded aperture and the rotational axis of the idler roll are on opposed lateral sides of the midpoint of the cross-brace;

an adjustment means for moving the cross brace within said bracket comprising: a threaded rod having a first and second ends, a rotating means for turning the threaded rod, a locking means for securing the adjustment means in a fixed position, and a means for securing said adjustment means to said slitter-rewinder;

said threaded rod engages the threaded aperture of said cross brace at the first end and the adjustment means at the second end, such that a rotation of the adjustment means rotates the threaded rod which causes said cross brace to move in said bracket, thereby changing the tension which said idler roll exerts on said drive belt.

2. The device as recited in claim 1 wherein the threaded rod is rotated by a human operator.

3. The device as recited in claim 1 wherein the threaded rod is rotated by a mechanized means.

* * * * *